(12) United States Patent
Kim et al.

(10) Patent No.: US 6,985,778 B2
(45) Date of Patent: Jan. 10, 2006

(54) NAND FLASH MEMORY INTERFACE DEVICE

(75) Inventors: Jin-soo Kim, Youngin (KR); Yong-je Kim, Youngin (KR); Jin-chul Pyo, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 10/446,146

(22) Filed: May 28, 2003

(65) Prior Publication Data

US 2004/0003168 A1 Jan. 1, 2004

(30) Foreign Application Priority Data

May 31, 2002 (KR) ........................................ 2002-30691

(51) Int. Cl.
*G05B 11/01* (2006.01)

(52) U.S. Cl. ................................ 700/17; 700/2; 700/3; 700/5; 700/7; 700/83; 711/1; 711/100; 711/165; 711/167

(58) Field of Classification Search ................. 700/2–3, 700/5–7, 17, 83; 711/1–5, 102, 103, 104, 711/105, 167, 165, 100
See application file for complete search history.

(56) References Cited

U.S. PATENT DOCUMENTS 6,263,399 B1 * 7/2001 Hwang ........................ 711/103

| | | | |
|---|---|---|---|
| 6,714,455 B2 * | 3/2004 | Banks | 365/185.22 |
| 2003/0028760 A1 * | 2/2003 | Chang et al. | 713/2 |
| 2004/0054864 A1 * | 3/2004 | Jameson | 711/167 |
| 2004/0193782 A1 * | 9/2004 | Bordui | 711/103 |

FOREIGN PATENT DOCUMENTS

| | | |
|---|---|---|
| EP | 1 067 749 | 1/2001 |
| EP | 1 387 284 | 2/2004 |
| GB | 2 340 629 | 2/2000 |
| JP | 10-063442 | 3/1998 |
| WO | 01/52062 | 7/2001 |

* cited by examiner

*Primary Examiner*—Ramesh Patel
(74) *Attorney, Agent, or Firm*—Staas & Halsey LLP

(57) ABSTRACT

An interface device and method thereof interfacing between a host processor and a NAND flash memory includes a register file, an internal memory, a flash interface portion, and a finite state machine. The register file receive a command from the host processor to control an operation of the NAND flash memory and an operation information to execute the command and storing the command and the operation information. The flash interface portion controls a control signal to operate the NAND flash memory, outputs the command, the operation information, or the host data, and controls an I/O signal wire through which the flash data is inputted to the NAND flash memory. The finite state machine extracts the command and the operation information from the register file and controls the internal memory and the flash interface portion to execute the command.

31 Claims, 11 Drawing Sheets

NAND FLASH MEMORY INTERFACE DEVICE

CROSS-REFERENCE TO RELATED APPLICATIONS

This application claims the benefit of Korean Application No. 2002-30691, filed May 31, 2002, in the Korean Intellectual Property Office, the disclosure of which is incorporated herein by reference.

BACKGROUND OF THE INVENTION

1. Field of the Invention

The present invention relates to an interface device, and more particularly, to a NAND flash memory interface device interfacing between a host processor and a NAND flash memory.

2. Description of the Related Art

A flash memory is a non-volatile memory, which enables on-line data programming and deleting. The flash memory electrically deletes the data using a same method as that of an electrically erasable and programmable ROM (EEPROM), and the memory may be entirely deleted in one second or several seconds. The data stored in the flash memory is deleted throughout the chip in a block unit, but it is impossible to delete the data in a byte unit. The flash memory stores a correctable control program, which is used instead of an auxiliary memory.

The flash memory is divided into a NAND flash memory and a NOR type flash memory. The NOR type flash memory uses an interface method as an SRAM or a ROM to easily construct a circuit with a processor. Further, the NAND flash memory is more sophisticated using the interface method than the NOR type flash memory and has an advantage of lower economic costs. However, the NAND flash memory has a higher degree of integration than the NOR flash memory.

Figure 1:
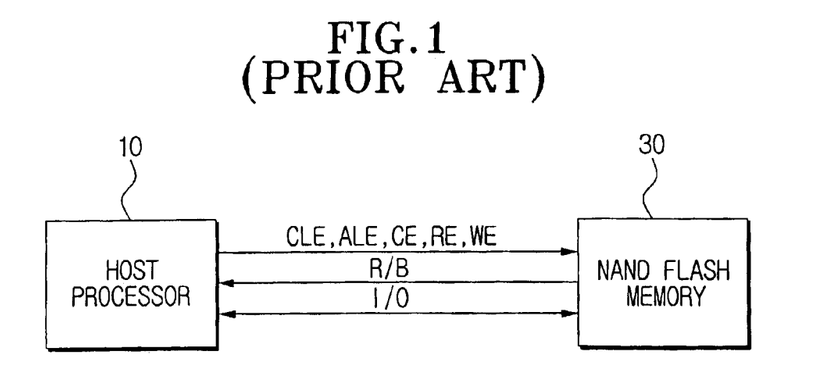
FIG. 1 is a block diagram showing a host processor and a NAND flash memory conventionally connected to each other.

FIG. 1 is a block diagram showing a connection of a host processor 10 and a NAND flash memory 30.

The host processor 10 includes a plurality of control wires, a plurality of address signal wires, and a plurality of data signal wires. The NAND flash memory 30 includes a plurality of control wires and an I/O (Data Input/Output) signal wire including 8 bits from I/O 0 to I/O 7.

The control wires of the host processor 10 (i.e., CLE (Command Latch Enable), ALE (Address Latch Enable), CE (Chip Enable), RE (Read Enable), WE (Write Enable) control wires) are connected to corresponding control wires of the NAND flash memory 30. The plurality of address signal wires and the plurality of data signal wires of the host processor 10 are connected with the I/O signal wire of the NAND flash memory 30. An R/B (Ready/Busy output) control wire of the NAND flash memory 30 is connected to a corresponding control wire of the processor 10.

Hereinbelow, the descriptions will be made about the operation of the NAND flash memory 30 in the above-connected state, and, for example, when the data is extracted from the NAND flash memory 30. The host processor 10 sets the signal of the CLE control wire at 'high' level and transmits a READ command to the NAND flash memory 30 through the I/O signal wire. After transmitting the READ command, the host processor 10 sets the signal of the ALE control wire at 'high' level and transmits an address to the NAND flash memory 30 through the I/O signal wire. The address transmitted from the host processor 10 is an address that is assigned to a location of the NAND flash memory 30 from which the data is extracted. Upon receipt of the READ command and the address, the NAND flash memory 30 extracts the data from an internal memory cell and transmits the extracted data to an internal input/output buffer. At this time, a signal level of the R/B control wire of the NAND flash memory 30 becomes "low", which means that an inner operation is being performed i.e., in a BUSY state.

When the inner operation of the NAND flash memory 30 is completed, the signal level of the R/B control wire becomes "high" and the data stored in the internal input/output buffer is transmitted to the host processor 10 through the I/O signal wire. The CE, RE, and WE control wires among the control wires, are operated the same as the interfacing method used in a general SRAM.

As set forth above, in order to use the NAND flash memory 30, a circuit is required to operate CLE, ALE, and R/B control wires in addition to the CE, RE, WE control wires that are used in the general SRAM. Also, the command, the address, and the data have to be transmitted through the I/O signal wire between the host processor 10 and the NAND flash memory 30. Thus, the NAND flash memory is not compatible with the general interface method used in the memory.

Conventionally, the ALE, CLE, and R/B control wires are connected to a GPIO port in order to use the NAND flash memory 30. Another method is to connect the CLE and ALE control wires to the $0^{th}$ address signal wire and the $1^{st}$ address signal wire of the processor, respectively, and to connect the R/B control wire to one of the upper data wires that are not in use.

However, the above-mentioned methods are rather complicated to control the NAND flash memory and a processing speed of the entire operations is slow. Also, because the I/O signal wire of the NAND flash memory 30 includes 8 bits, at least two NAND flash memories are required when a demanded data width is equal to or more than 16 bits. Accordingly, a number of the NAND flash memory has to increase depending on a type of the processor, and thus, there is a problem of enlarged size of the entire circuit.

Also, there is a problem when the NAND flash memory 30 stores a booting code. With respect to the booting code, when the NAND flash memory 30 supports an error correction code (ECC) checking function in a software-like method without an extra circuit, a booting speed is slow. Accordingly, an extra circuit is required.

SUMMARY OF THE INVENTION

The present invention has been developed in order to solve the above problems in the related art. Accordingly, an aspect of the present invention is to provide an interface device capable of controlling a NAND flash memory by simply using an interface method used in a general memory.

Another aspect of the present invention is to provide an interface device that does not require a number of NAND flash memories to increase even when a data width of a processor connected to the NAND flash memory is increased.

Still another aspect of the present invention is to provide an interface device capable of rapidly detecting an error, supporting an error detecting function in a hardware-like method when data is input/output to/from a NAND flash memory.

Additional objects and advantages of the invention will be set forth in part in the description which follows and, in part, will be obvious from the description, or may be learned by practice of the invention.

According to an aspect of the present invention, there is provided an interface device including: a register file receiving a command from the host processor to control an operation of the NAND flash memory and an operation information to execute the command and storing the command and the operation information; an internal memory receiving and storing host data from the host processor and storing flash data extracted from the NAND flash memory and transmitted to the host processor; a flash interface portion controlling a control signal to operate the NAND flash memory, outputting the command, the operation information, or the host data, and controlling an I/O signal wire through which the flash data is inputted; and a finite state machine extracting the command and the operation information from the register file and controlling the internal memory and the flash interface portion to execute the command.

The command is a READ command, a WRITE command, an ERASE command, an INVALID CHECK command, or a WRITE INVALID command. The operation information includes a starting address to be assigned to a location of the NAND flash memory in which an operation according to the command is performed.

The control signal includes at least one of an ALE (Address Latch Enable) control signal, a CLE (Command Latch Enable) control signal, a CE (Chip Enable) control signal, a RE (Read Enable) control signal, and a WE (Write Enable) control signal. Also, the internal memory further includes an ECC checker generating an error correction code and detecting an error when the host data and the flash memory are input/output.

The register file is provided with an address register to store a starting address, a command register to store the command, and a status register a status register to store at least one of information of an operation status of the command and a result of the execution of the command.

According to an aspect of the present invention, there is provided a method of interfacing between a host processor and a NAND flash memory including a control wire and an I/O signal wire including: receiving a command from the host processor to control an operation of the NAND flash memory and operation information to execute the command; decoding the command and the operation information; and controlling the control wire and the I/O signal wire to execute an operation according to the decoded command.

The command is a READ command, a WRITE command, an ERASE command, an INVALID CHECK command, or a WRITE INVALID command. The operation information includes a starting address to be assigned to a location of the NAND flash memory in which an operation according to the command is performed. The control signal includes an ALE control signal, a CLE control signal, a CE control signal, a RE control signal, and a WE control signal.

BRIEF DESCRIPTION OF THE DRAWINGS

These and/or other objects and advantages of the invention will become apparent and more readily appreciated from the following description of the embodiments, taken in conjunction with the accompanying drawings of which.

DETAILED DESCRIPTION OF THE PREFERRED EMBODIMENT

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
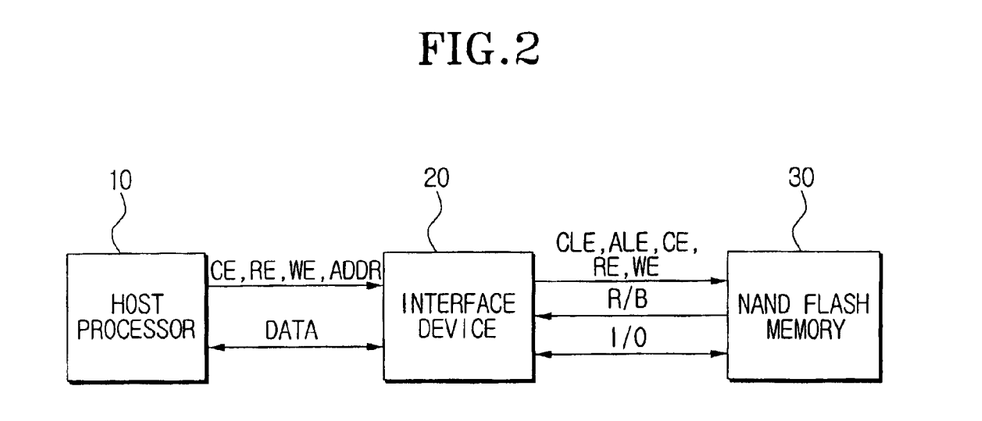
FIG. 2 is a block diagram showing a connection of an interface device, the host processor, and the NAND flash memory, according to an aspect of the present invention.

FIG. 2 is a block diagram showing an interface device 20, a host processor 10, and a NAND flash memory connected to each other, according to an aspect of the present invention. As shown in FIG. 2, the interface device 20 is interposed between the host processor 10 and the NAND flash memory 30.

The host processor 10 has a plurality of control wires, a plurality of address (ADDR) signal wires, and a plurality of DATA signal wires. The interface device 20 has a plurality of control wires, the plurality of DATA signal wires, and an I/O (Data Input/Outputs) signal wire including 8 bits from I/O 0 to I/O 7. The NAND flash memory 30 has a plurality of control wires and an I/O signal wire including the 8 bits of I/O 0 to I/O 7.

CE (Chip Enable), RE (Read Enable), and WE (Write Enable) control wires of the host processor 10 are connected to the corresponding control wires of the interface device 20. The ADDR signal wires and the DATA signal wires of the host processor 10 are respectively connected to the ADDR signal wires and the DATA signal wires of the interface device 20.

ALE (Address Latch Enable), CLE(Command Latch Enable), CE(Chip Enable), RE(Read Enable), and WE(Write Enable) control wires of the interface device 20 are connected to the corresponding control wires of the NAND flash memory 30. The I/O signal wire of the interface device 20 is connected to the I/O signal wire of the NAND flash memory 30, and an R/B (Ready/Busy output) control wire from the NAND flash memory 30 is connected to a corresponding control wire of the interface device 20.

Under the above-described connecting state, the host processor 10 transmits a command to control an operation of the NAND flash memory 30 and transmits operation information necessary to execute the command to the interface device 20. When the command concerns a reading operation, the operation information necessary to execute the command includes an address to be assigned to a location in the NAND flash memory 30 from which data is extracted. When the command concerns a writing operation, the operation information includes an address to be assigned to a location in the NAND flash memory 30 where the data is stored. Upon receipt of the command from the host processor 10, the interface device 20 controls the NAND flash memory 30 to execute the command.

For example, when the interface device 20 receives a READ command from the host processor 10, the interface device 20 sets a signal level of the CLE control wire at "high" and transmits the READ command to the NAND flash memory 30 through the I/O signal wire. After transmitting the READ command, the interface device 20 sets a signal level of the ALE control wire at "high" and transmits the address to the NAND flash memory 30 through the I/O signal wire. Upon receipt of the command and the address, the NAND flash memory 30 transfers the data from an internal memory cell therein to an internal input/output buffer. Then, a signal level of the R/B control wire becomes "low" and the NAND flash memory displays a BUSY state. When the operation of the NAND flash memory 30 is completed, the signal level of the R/B control wire becomes "high" and the data stored in the internal input/output buffer is transmitted to the interface device 20 through the I/O signal wire. The interface device 20 transmits the data to the host processor 10 through the DATA signal wires.

When the interface device 20 receives a WRITE command from the host processor 10, the transmissions of the command and the address are performed in the same order as the READ command. That is, the interface device 20 sets the signal level of the CLE control wire at "high" and outputs the WRITE command through the I/O signal wire. The interface device 20 sets the signal level of the ALE control wire at "high" and outputs the address through the I/O signal wire. After outputting the address, the interface device 20 inputs the data sequentially.

After inputting the data, the interface device 20 transmits the address again. In the case of the WRITE command, the command is inputted to the interface device 20 two times, a first time command to instruct to input the data to the internal buffer of the NAND flash memory 30, and a second time command to instruct to transfer the data from the internal buffer to the memory cell. Same as the READ command, the signal level of the R/B control wire is "high" when the operation is completed. The interface device 10 confirms whether the operation is smoothly performed by checking the I/O signal wire. Resultant information is stored in the interface device 20, and the host processor 10 recognizes the result of the operation with reference to the information stored.

Figure 3:
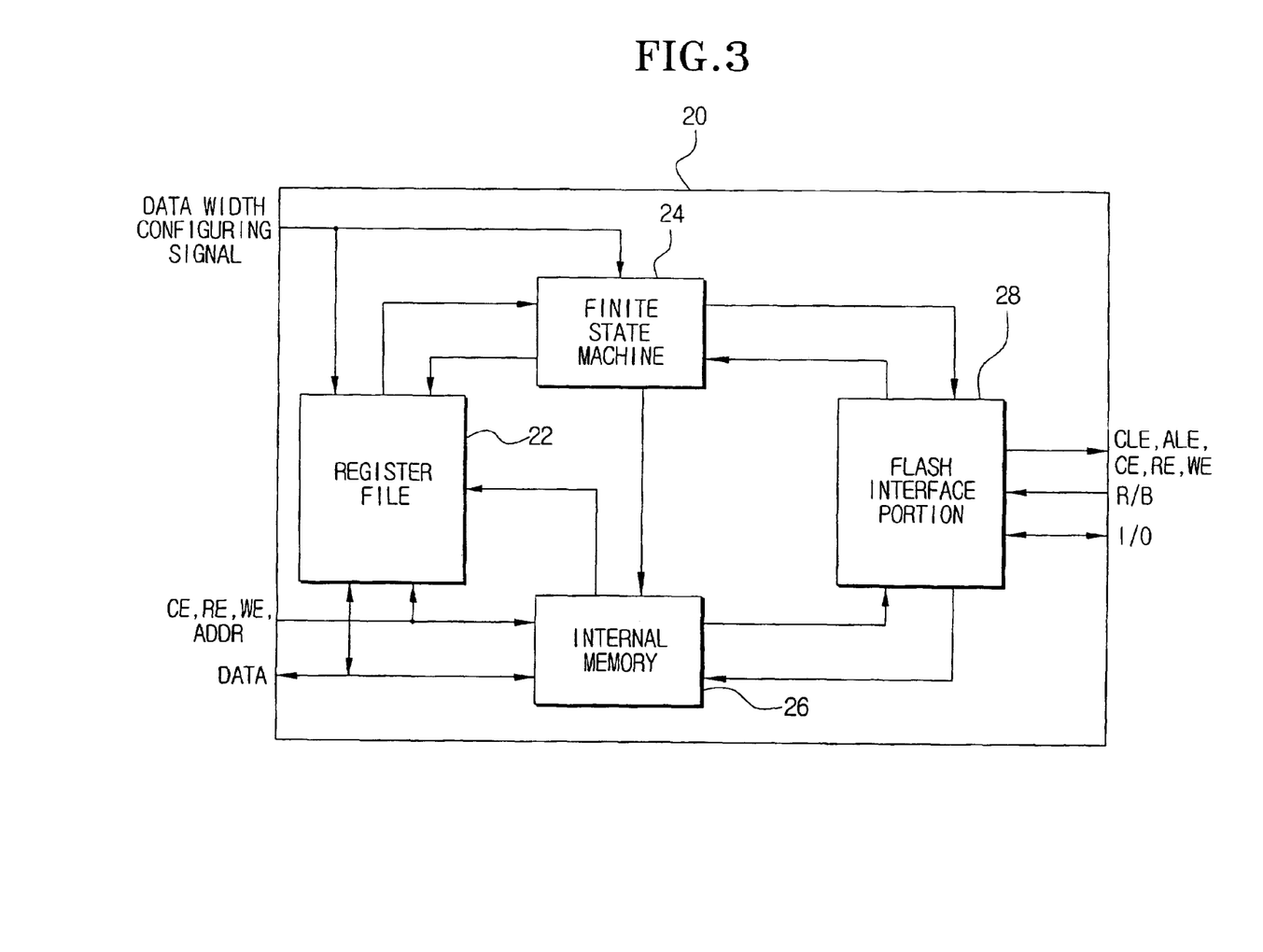
FIG. 3 is a block diagram showing the interface device, according to an aspect of the present invention.

FIG. 3 is a block diagram illustrating the interface device 20 of FIG. 2. The interface device 20 includes a register file 22, a finite state machine 24, an internal memory 26, and a flash interface portion 28.

The register file 22 receives a command and the operation information necessary to execute the command from the host processor 10 and stores the same therein. The register file 22 is provided with a command register and an address register. The command and the address transmitted from the host processor 10 are respectively stored in the command register and the address register.

The register file 22 is also provided with a status register. The status register stores operation status of a currently executed command and a result of an execution of the command, etc. The host processor recognizes the result of the execution of the command with reference to the status register.

The finite state machine 24 extracts the command transmitted from the host processor 10 and stored in the register file 22, and controls the operation of the interface device 20 including the internal memory 26 and the flash interface portion 28 to execute an operation corresponding to the command.

When the finite state machine 24 controls the operations according to the extracted command, the finite state machine 24 outputs an execution starting signal to the register file 22 and stores an operation status resulting from the execution of the command in the register file 22. After completing the operation according to the command, the finite state machine 24 checks the result of the operation and writes the same onto the status register of the register file 22 for the reference of the host processor 10.

The internal memory 26 includes a booting SRAM, a buffer, and an ECC checker. There are four readable and writable buffers in the internal memory 26. The buffer is sectioned into pages, each of the pages having a predetermined size. Each page has a reserved region, which is allocated with a byte for the ECC and a byte for an Invalid/Valid block marking.

The buffer of the internal memory 26 stores the data to be transmitted from the host processor 10 to the NAND flash memory 30 and the data extracted from the NAND flash memory 30. The ECC checker of the internal memory 26 generates an error correction code with respect to the data stored in the internal memory 26 to detect the error. A result of the error detection is transmitted to the register file 22 and stored in the register file 22. The host processor 10 recognizes the result of the error detection with reference to the register file 22.

The flash interface portion 28 controls the ALE, CLE, CE, OE, WE control wires and the I/O signal wire according to the control of the infinite state machine 24 to accord with an interface standard of the NAND flash memory 30, and receives the signal of the R/B control wire from the NAND flash memory 30. Through the I/O signal wire, the flash interface portion 28 outputs the command, the operation information necessary to execute the command, and the data transmitted from the host processor 10 to the NAND flash memory 30. Also, through the I/O signal wire, the data extracted from the NAND flash memory 30 is input and stored in the internal memory 26. If the interface standard of the NAND flash memory 30 has to be changed, adjusting the flash interface 29 alone in the interface device 20 is sufficient to accord with the changed standard.

Table 1 shows a pin array of the interface device 20. The direction in Table 1 expresses a flow direction of a signal. That is, I is an input pin through which the interface device 20 receives the signal, O is an output pin through which the interface device 20 outputs a signal, and I/O is an input/output pin through which the interface device 20 receives or outputs the signal.

TABLE 1

| Pin Name | Direction | Description | Others |
| --- | --- | --- | --- |
| CLOCK | I | Interface Device Operation Clock | |
| RESET | I | External Reset | |
| ADDR (15:0) | I | Host Address | |
| HOST_DATA (31:0) | I/O | Host Data | |
| CS | I | Chip Select | Low Active |
| OE | I | Output Enable | |
| WE | I | Write Enable | |
| FLASH_ALE | O | Address Latch Enable | |
| FLASH_CLE | O | Command Latch Enable | |
| FLASH_CE | O | Chip Enable | |
| FLASH_RE | O | Read Enable | |
| FLASH_WE | O | Write Enable | |
| FLASH_BUSY | I | READY/BUSY | Low Active |
| IO_DATA | I/O | I/O Data | |
| DATA_WIDTH | I | Data Width | |
| FLASH_DATA_WIDTH | I | Flash Data Width | |
| ASIC_BUSY | O | Busy Signal | |

As shown in Table 1, a pin ADDR (15:0) is connected to the ADDR signal wire of the host processor 10, and a pin HOST_DATA (31:0) is connected to the DATA signal wire of the host processor 10. Pins CS, OE, and WE are respectively connected to the CE, OE, and WE control wires.

Output pins, FLASH_ALE, FLASH_CLE, FLASH_CE, FLASH_RE, FLASH_WE, are connected to the ALE, CLE, CE, RE, and WE control wires of the flash memory 30, and a pin FLASH_BUSY is connected to the R/B control wire. Through a pin CLOCK, a CLOCK signal for an operation is input, and through a pin RESET, a reset signal is externally inputted.

Through a pin DATA_WIDTH, a data width configuring signal is inputted. According to the inputted signal, a width of the data to be processed by the interface device 20 varies. A pin FLASH_DATA_WIDTH is a pin that is reserved for the NAND flash memory 30 having the data width equal to or more than 16 bits. Also, a pin ASIC_BUSY is a pin that outputs a signal indicating whether the interface device 20 is on a BUSY state or not.

Tables 2 and 3 show a memory map in the interface device 20. Table 2 lists the interface in the case of having the data of 16 bits, and Table 3 lists the interface in the case of having the data of 32 bits. The variation of the data width is made according to the data width configuring signal inputted through the pin DATA_WIDTH. That is, when a low signal is inputted through the pin DATA_WIDTH, the interface device 20 interfaces the data of 16 bits, while when a high signal is inputted, the interface device 20 interface the data of 32 bits.

TABLE 2

| Range | Name | | Descriptions |
|---|---|---|---|
| 0x0000~0x1fff | Boot Rom | | Boot loader |
| 0x8000~0x810f | Read Buffer | Read Buffer 0 | Buffer of 528 byte used when reading data from NAND flash |
| 0x8200~0x830f | | Read Buffer 1 | Buffer of 528 byte used when reading data from NAND flash |
| 0x8400~0x850f | Write Buffer | Write Buffer 0 | Temporary buffer of 528 byte used when writing data on NAND flash |
| 0x8600~0x870f | | Write Buffer 1 | Temporary buffer of 528 byte used when writing data on NAND flash |
| 0xc000~0xc1f | Register File | | Register File |

TABLE 3

| Range | Name | | Descriptions |
|---|---|---|---|
| 0x000~0x0fff | Boot Rom | | Boot loader |
| 0x8000~0x8083 | Read Buffer | Read Buffer 0 | Buffer of 528 byte used when reading data from NAND flash |
| 0x8200~0x8183 | | Read Buffer 1 | Buffer of 528 byte used when reading data from NAND flash |
| 0x8400~0x8283 | Write Buffer | Write Buffer 0 | Temporary buffer of 528 byte used when writing data on NAND flash |
| 0x8600~0x8383 | | Write Buffer 1 | Temporary buffer of 528 byte used when writing data on NAND flash |
| 0xc000~0xc00f | Register File | | Register File |

FIGS. 4A through 4G are flow charts showing an operating process of the interface device 20 with respect to the NAND flash memory.

Figure 4A:
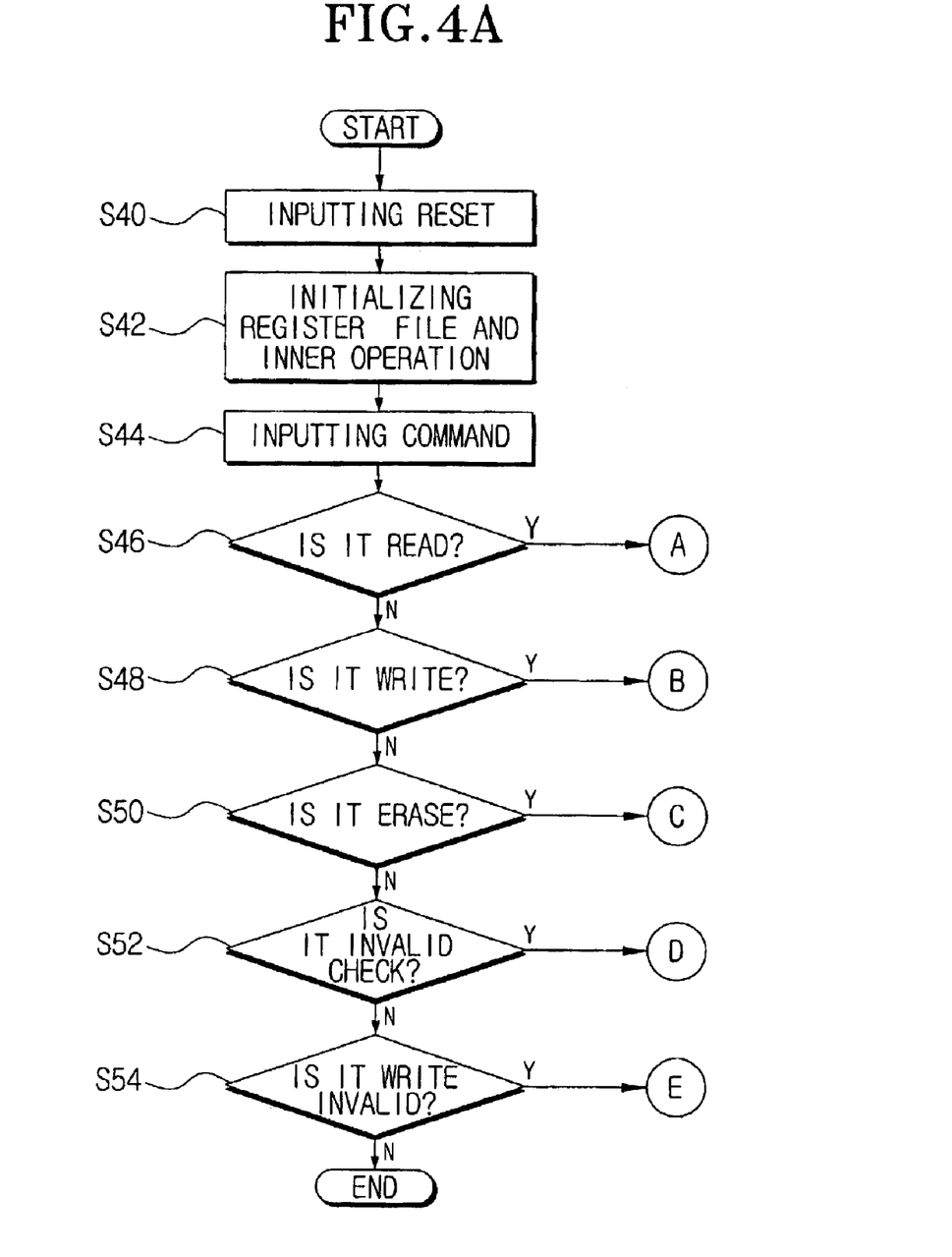
FIGS. 4A through 4G are flow charts showing operating processes of the interface device, according to an aspect of the present invention.

As shown in FIG. 4A, at S40, a RESET signal is input to the RESET pin of the interface device 20 from an outside source. At S42, when the RESET signal is input, the register file 22 and the finite state machine 24 are initialized. After initialization, at S44, the command is input to the interface device 20 from the host processor 10. The interface device 20 controls the operation of the NAND flash memory 30 according to a type of the input command. At S46, if the input command is the READ command, the process proceeds to FIG. 4B.

Figure 4B:
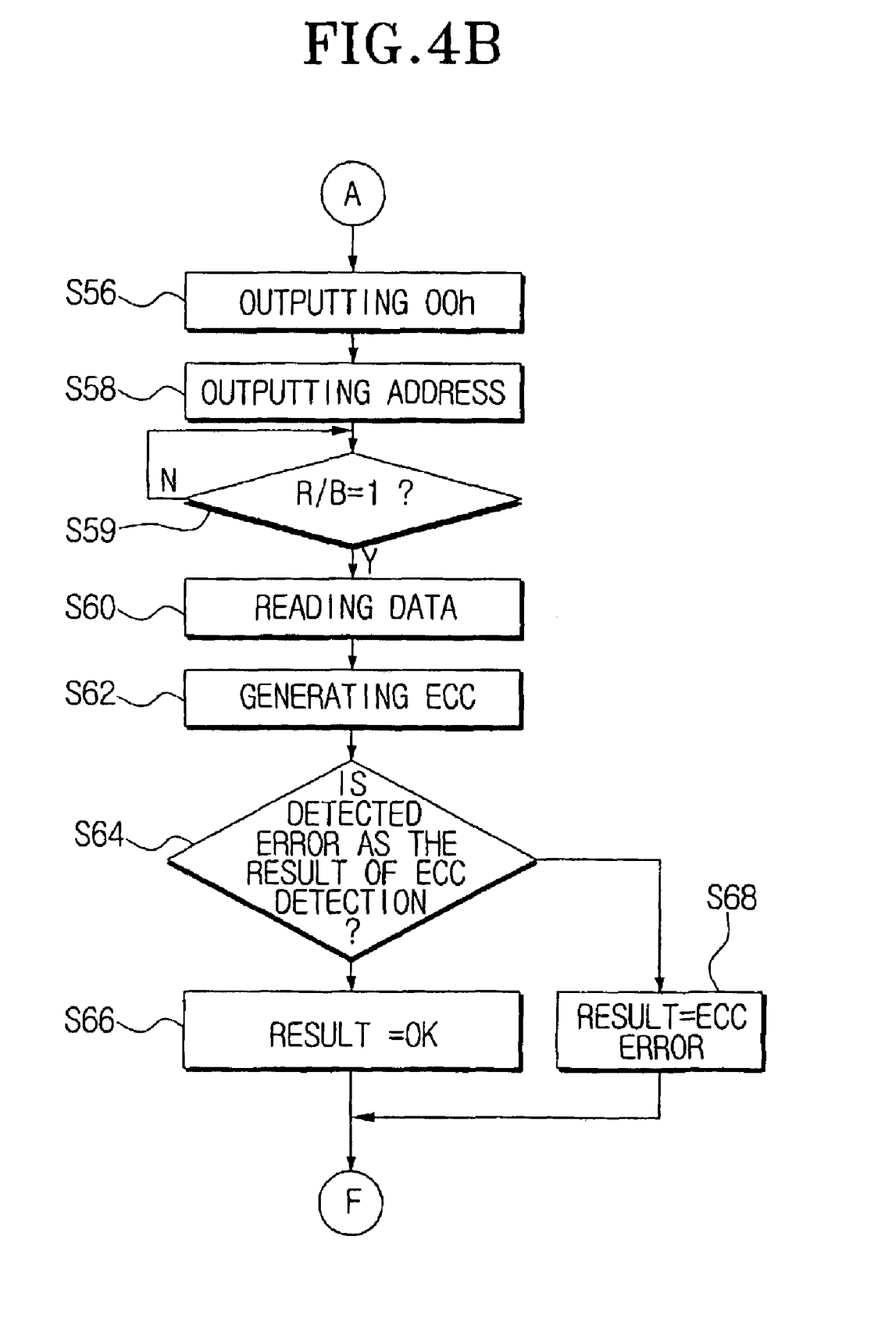

FIG. 4B shows the case of having the READ command. At S56, the interface device 20 outputs a value '00h' through the I/O signal wire. The READ command instructs to extract data from the NAND flash memory 30, and the value '00h' is defined as executing a READ operation in the NAND flash memory 30. After outputting the value '00h', at S58, the interface device 20 outputs a starting address to be assigned to a location in the NAND flash memory 30 from which the data is extracted through the I/O signal wire. Because the NAND flash memory 30 has a size of equal to or more than several tens of Mbytes, a required number addresses bit is more than or equal to 20. However, because the I/O signal wire includes 8 bits, the address is inputted sequentially at least three times.

When the address is inputted, at S59, the interface device 20 detects whether the R/B equals to 1. If the R/B equals to 1, the NAND flash memory 30 completes the inner operation. Accordingly, at S60, the interface device 20 sequentially reads the data output from the corresponding location of the NAND flash memory 30. The data output from the NAND flash memory 30 is stored in the internal memory 26. At this time, at S62, an ECC occurs, and, at S64, the interface device 20 determines whether there is an error by detecting the ECC. If it is determined that the error occurred, at S68, a RESULT is ECC ERROR, and if there is no error, at S66 the RESULT is OK.

Figure 4C:
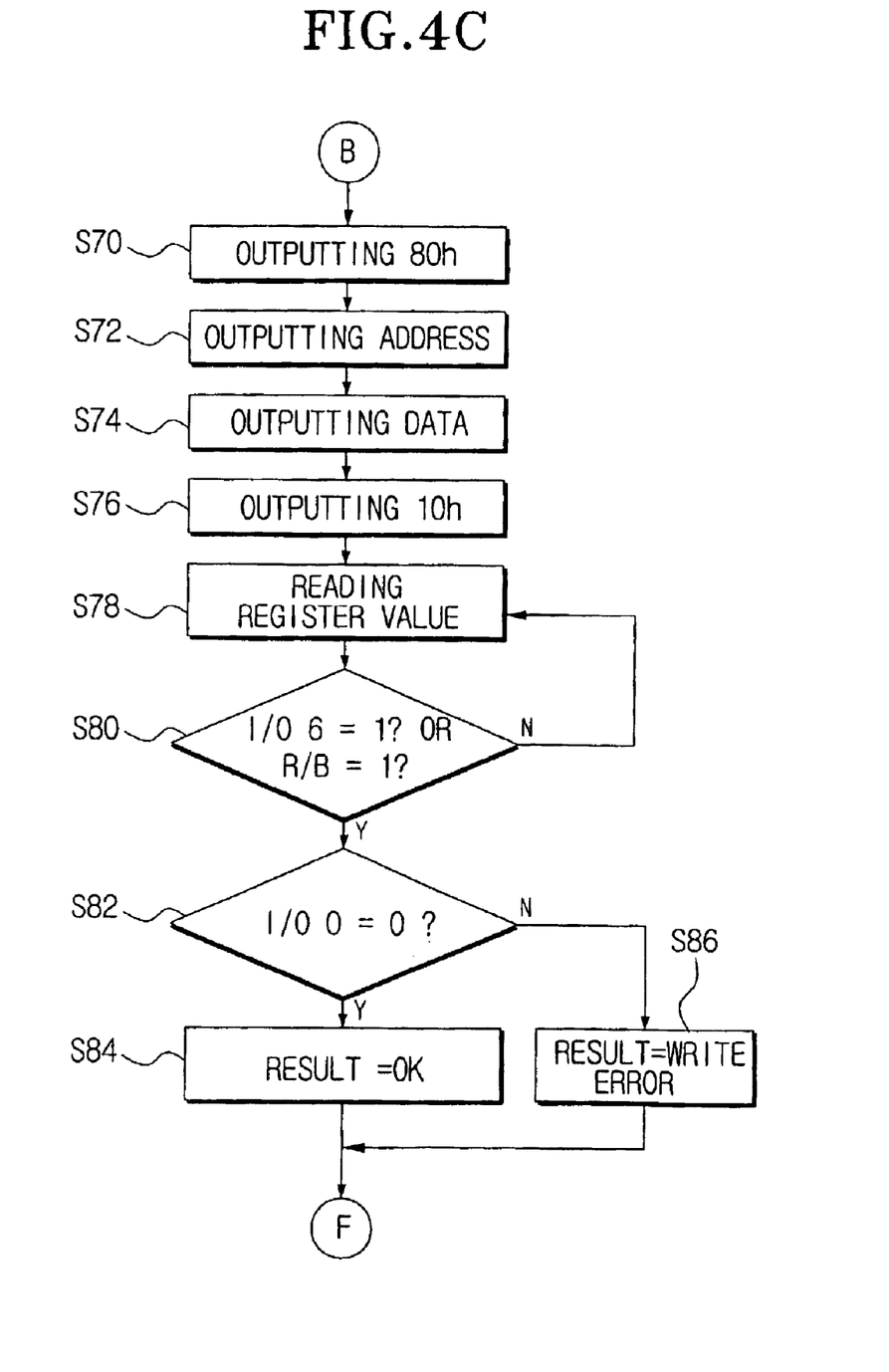
Figure 4D:
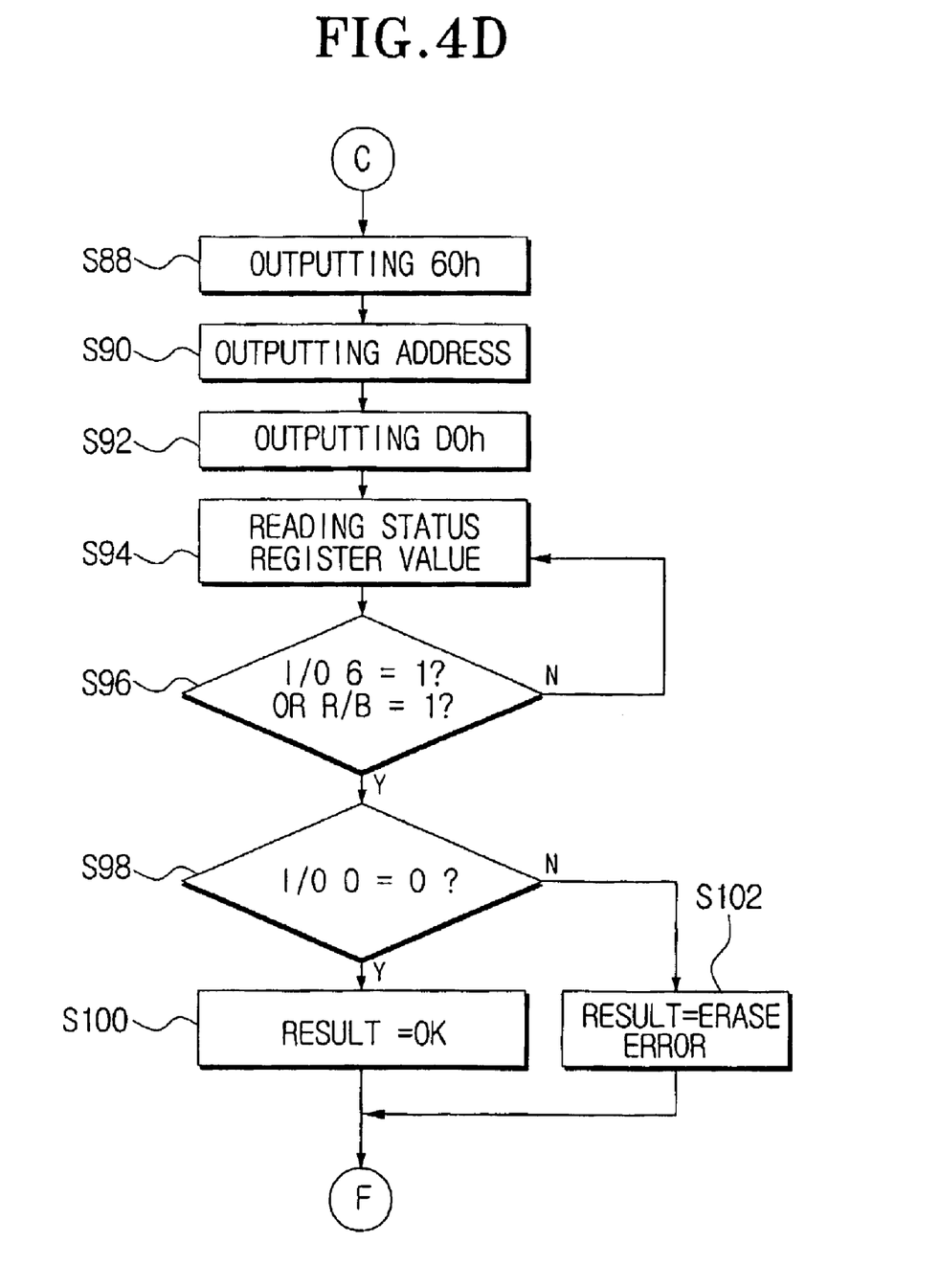
Figure 4E:
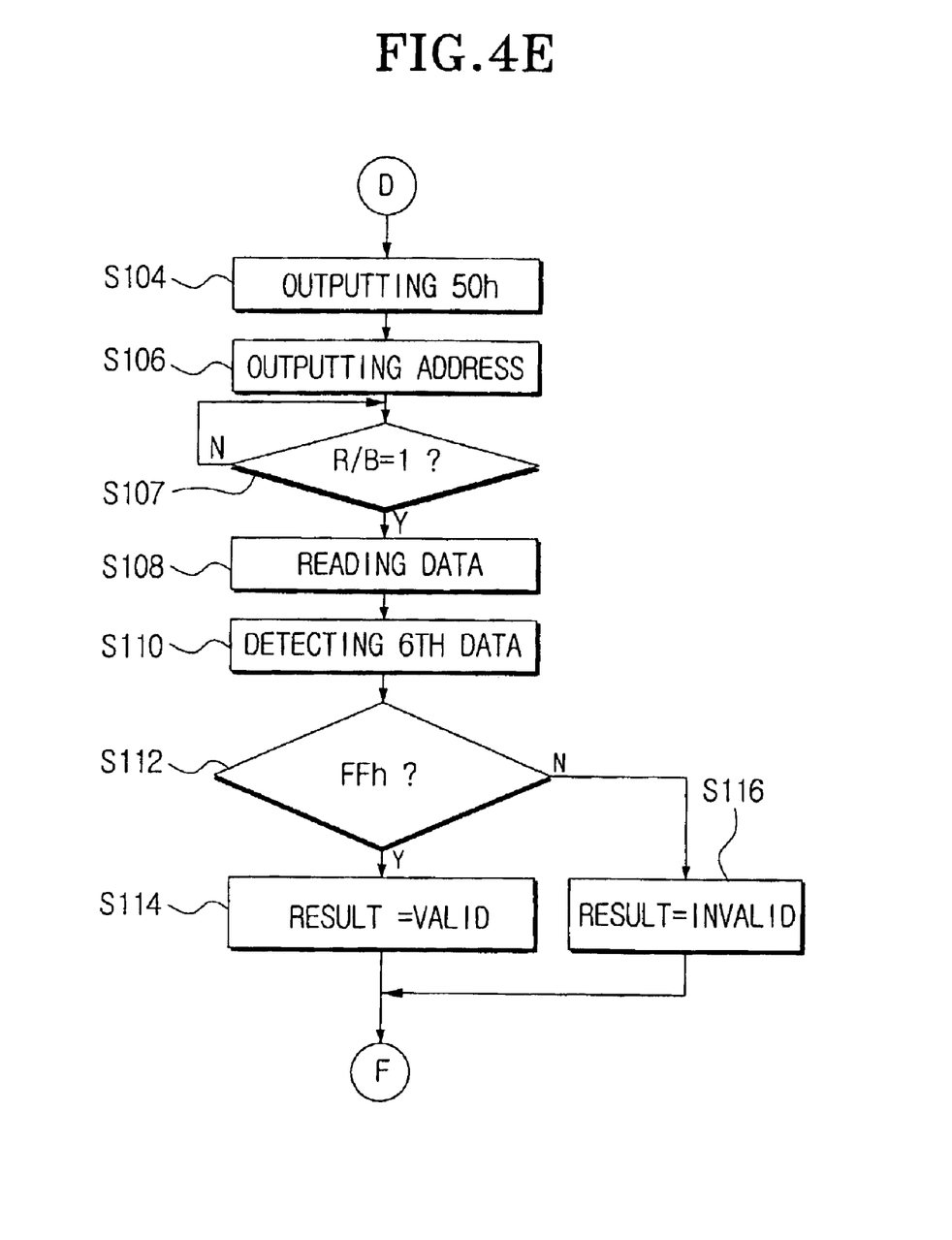
Figure 4F:
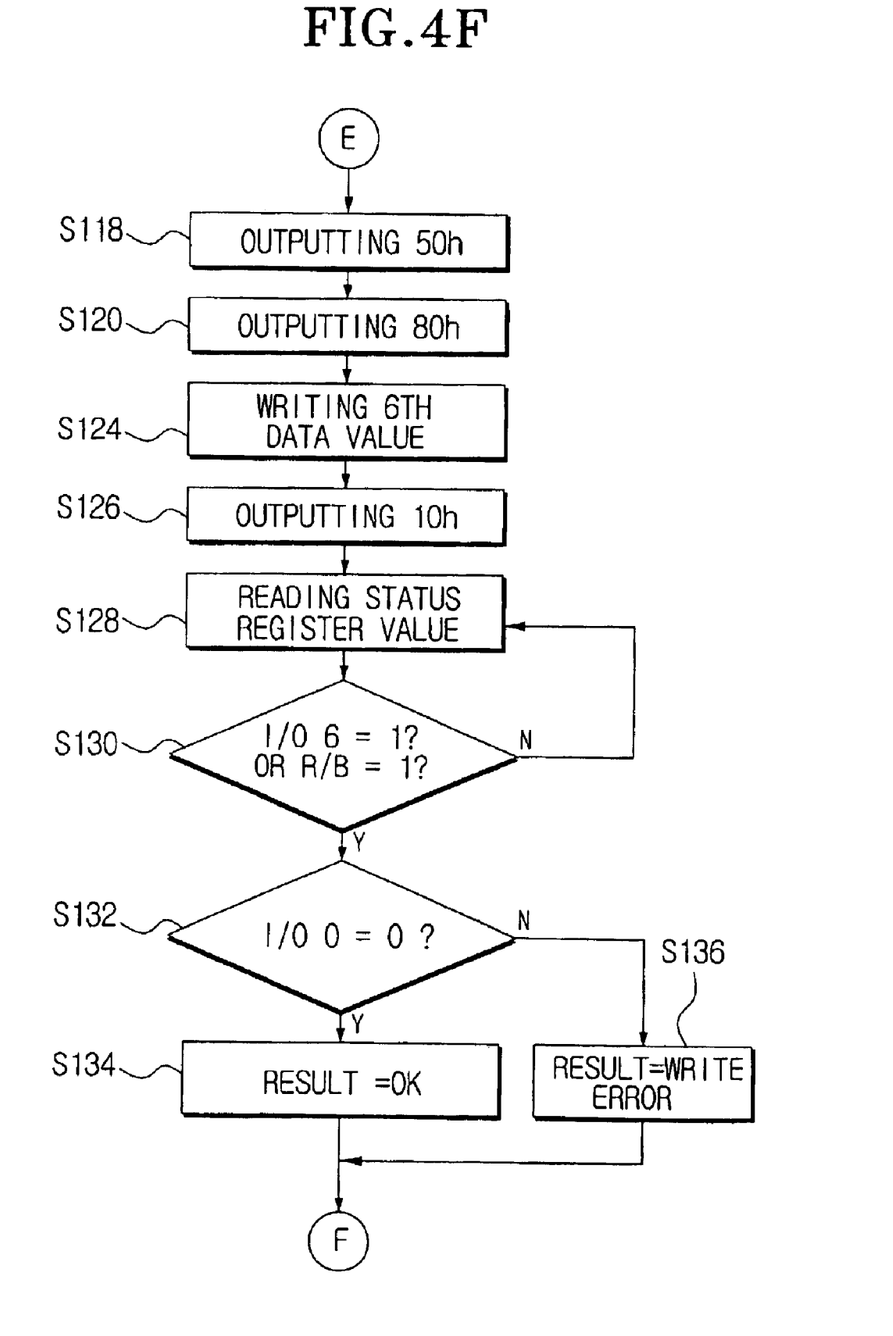
Figure 4G:
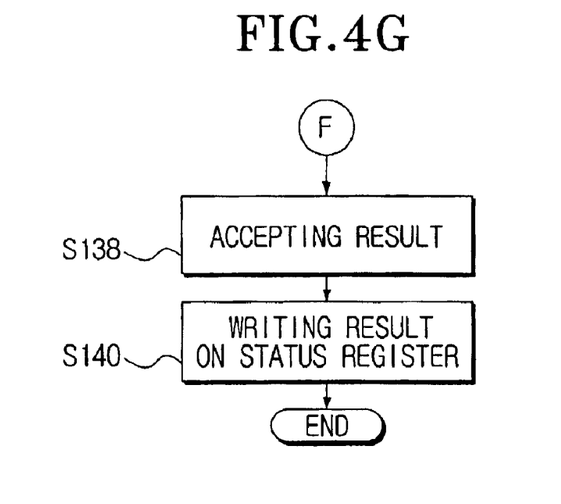

Referring to FIG. 4G, after processing the command, at S138 the interface device 20 accepts the RESULT and, a S140, writes the RESULT on the status register and the execution of the READ command is completed.

Referring back to FIG. 4A, at S48, if the input command is the WRITE command, the process proceeds to FIG. 4C. FIG. 4C shows the case of having the WRITE command. The WRITE command instructs to store data in the NAND flash memory 30. In this case, at S70, the interface device 20 outputs a value '80h'. At S72, the interface device 20 outputs an address and, at S74, the interface device 20 outputs the data using the same method as the READ command. Then, at S76, the interface device 20 outputs a value '10h'. As described above, the WRITE command is output two times. After outputting the command, at S78, the interface device 20 reads a value of the status register. At S80, if I/O 6 of the I/O signal wires equals to 1 or R/B equals to 1, the inner operation is completed. If not, at S80, the inner operation is being processed, i.e., the interface device 20 waits for the completion of the inner operation. Because the values of the signal wires are stored in the status register, the interface device 20 recognizes that the inner operation is completed, by referring the values stored in the status register.

If the inner operation is completed, at S82, the interface device 20 determines whether I/O 0 of the I/O signal wires equals to 0. If the WRITE command is successfully executed, the I/O 0 equals to 0. If there is an error during the execution of the WRITE command, the I/O 0 equals to 1. Accordingly, it is determined whether there is an error during the execution of the command. If the error is detected, at S86, a RESULT is WRITE ERROR, and if there is no error, at S84, the RESULT is OK. Then, the processes are performed in the same way as the method to process the READ command, as shown in FIG. 4G.

Referring back to FIG. 4A, at S50, if the input command is the ERASE command, the process proceeds to FIG. 4D. FIG. 4D shows the case of having the ERASE command. The ERASE command instructs to delete data stored in a corresponding area. In this case, at S88, the interface device 20 outputs '60h'. At S90, the interface device outputs an address and, at S92, it outputs 'D0h'. After outputting the command, at S94, the interface device 20 reads a value of the status register. At S96, if the I/O 6 of the I/O signal wires equals to 1 or R/B equals to 1, the inner operation is completed. If not, at S96, the inner operation is being processed, i.e., the interface device 20 waits for the completion of the inner operation. After that, at S98, the interface determines whether the I/O 0 equals to 0 as the same method as the WRITE command process. If the I/O 0 equals to 0, at S100 the ERASE command is executed without any error and, thus, the RESULT is OK. If not, at S102, an error occurred during the execution of the command and, thus, the RESULT is an ERASE ERROR. Then, the processes are performed in the same way using the method to process the READ command, as shown in FIG. 4G.

Referring back to FIG. 4A, at S52, if the input command is a INVALID CHECK command, the process proceeds to FIG. 4E. FIG. 4E shows the case of having the INVALID CHECK command. At S104, the interface device 20 outputs '50h'. The INVALID CHECK command instructs to search an invalid block that has at least one defective bit and thus does not have reliability. After outputting '50h', At S106, the interface device 20 outputs an address of a block to be checked, and, at S107, checks whether R/B equals to 1. If the R/B equals to 1, at S108, the interface device 20 reads data and checks, at S110 and S112, whether the 6th byte of a spare area is 'FFh'. The NAND flash memory 30 has pages, each of which has several bytes set as the spare area. The information on the invalid block is stored in the 6th byte of the spare area. If the value of the 6th byte of the spare area is 'FFh', at S114, there is no defective bit in the corresponding block and the RESULT is VALID. If not, at S116, the RESULT is INVALID. Then, the processes are performed in the same way as the method for processing the READ command, as shown in FIG. 4G.

Referring back to FIG. 4A, at S54, if the input command is a WRITE INVALID command, the process proceeds to FIG. 4F. FIG. 4F shows the case of having the WRITE INVALID command. At S118, the interface device 20 outputs '50h' and, at S120 outputs '80h'. The WRITE INVALID command uses invalid block information. After outputting the '80h', at S124 and S126, the interface device 20 writes a value corresponding to the invalid block information of the 6th byte data of the spare area and outputs '10h'. At S128, the interface device 20 reads a value of the status register. At S130, if the I/O 6 of the I/O signal wires equals to 1 or R/B equals to 1 the inner operation is completed. If not, at S130, the inner operation is being processed and thus the interface device waits for the completion of the inner operation. If the inner operation is completed, at S132, the interface device 20 determines whether I/O 0 equals to 0. If the I/O 0 equals to 0, at S134, the RESULT is OK. If not, at S136, the RESULT is WRITE ERROR. The further processes are performed as the same method as the READ command.

Figure 5A:
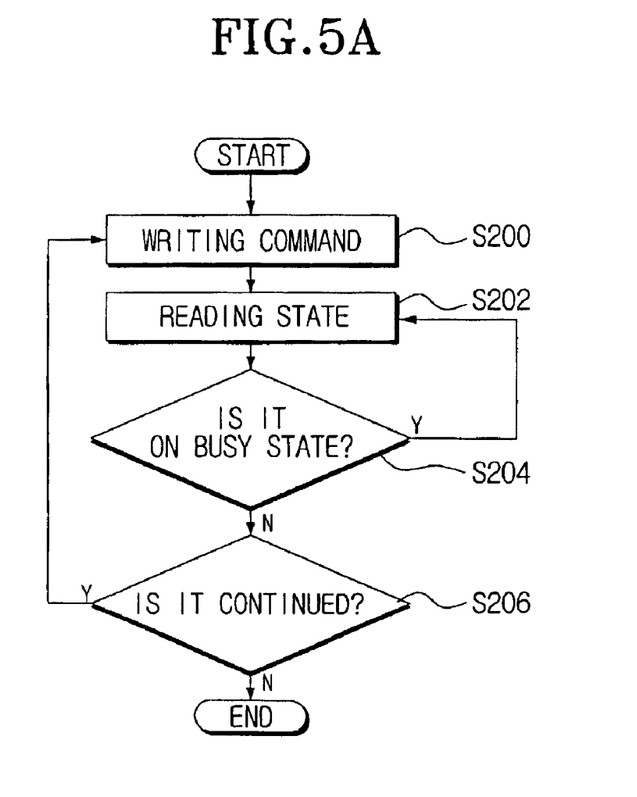
FIGS. 5A through 5C are flow charts showing operating processes of the host processor with respect to the interface device, according to an aspect of the present invention.
Figure 5B:
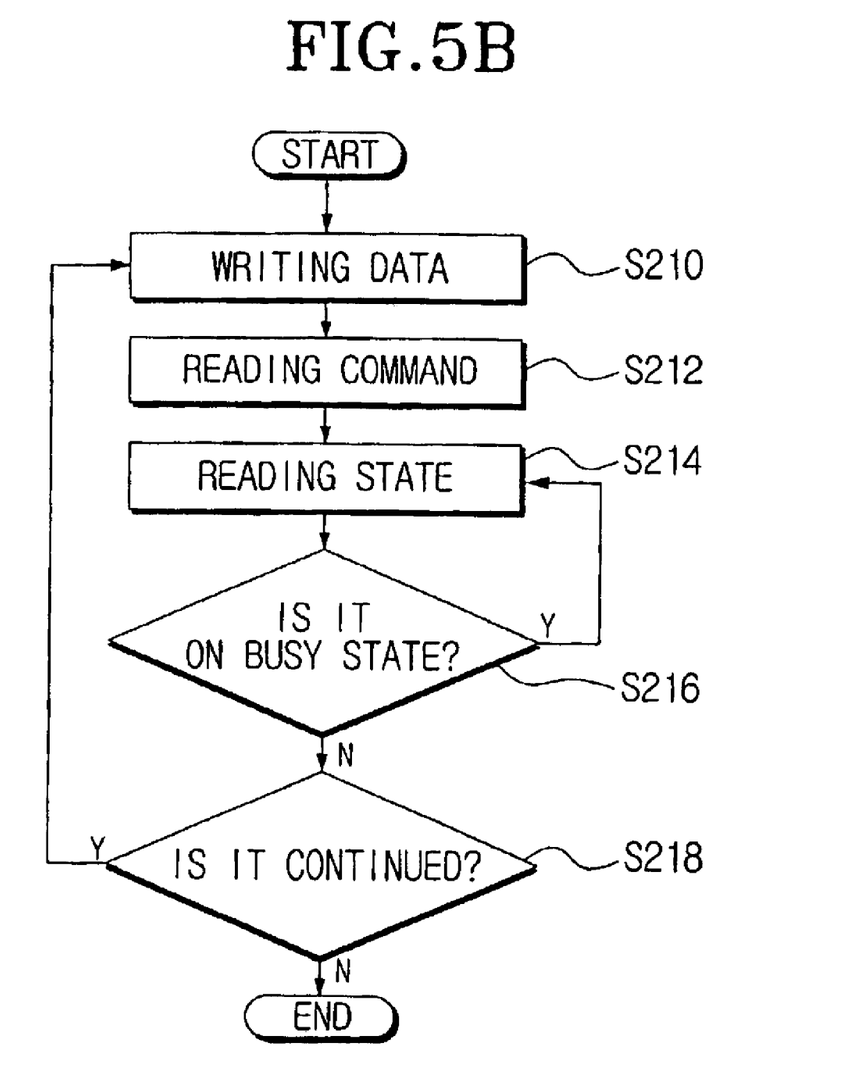
Figure 5C:
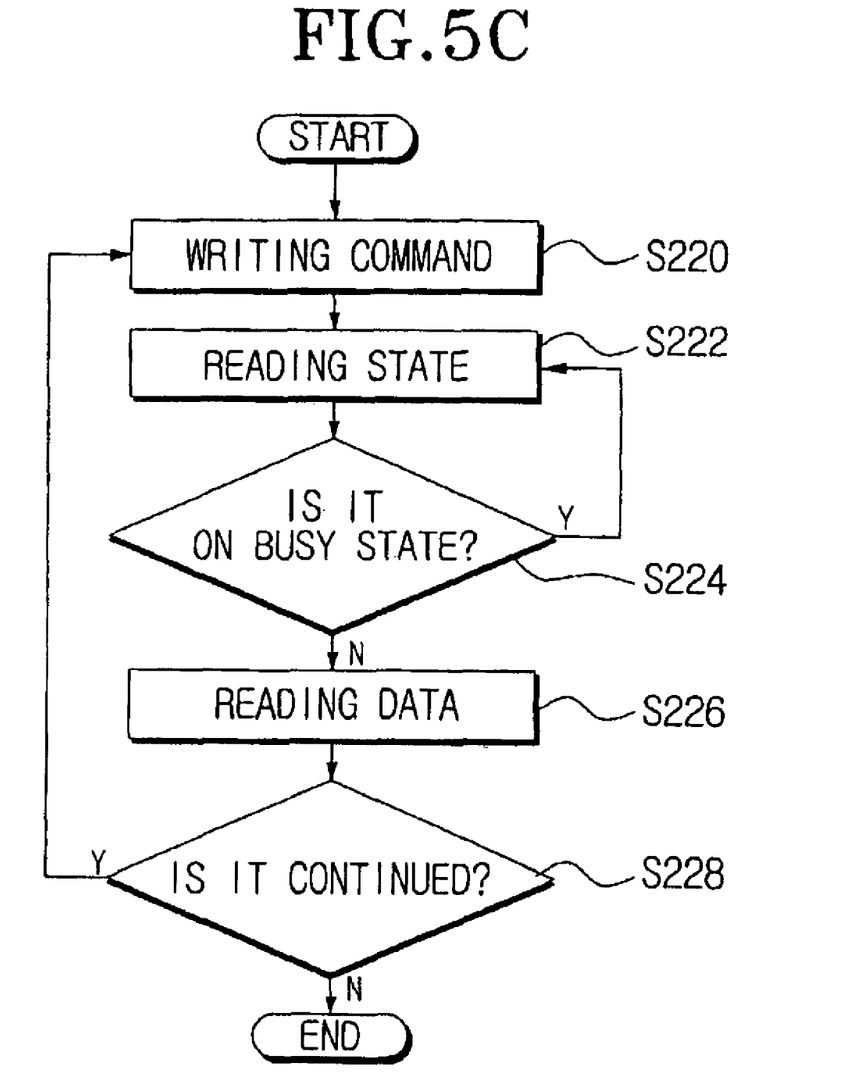

FIGS. 5A through 5C are flow charts showing an operating process of the host processor 10 with respect to the interface device 20.

FIG. 5A shows the case of having the ERASE command. In this case, at S200, the host processor 10 writes the ERASE command, at S202, reads the state of the interface device 20, and, at S204, checks whether the interface device 20 is on the BUSY state. The host processor recognizes that the interface device 20 is on the BUSY state by referring to the R/B control signal that is output from the NAND flash memory 30 and accepted by the interface device 20 and recorded in the register file 22. Alternatively, the interface device 20 can interrupt the host processor 10 in a hardware level after checking the signal of the pin ASCI_BUSY whether the BUSY state has ended. If the interface device 20 is in the BUSY state, at S202 and S204, the host processor stands by. When the BUSY state is finished, at S206, the host processor 10 determines whether to output a command continuously. If there is a command to be output, the above process is repeated, and if there is no command to be output, the process is finished.

FIG. 5B shows the case of having the WRITE COMMAND. In this case, at S210, the host processor 10 writes data, and, at S212, outputs the WRITE command. After writing the command, at S212 and S214, the host processor 10 reads the status of the interface device 20 and checks whether the interface device 20 is on the BUSY state. If the interface device 20 is on the BUSY state, at S214 and S216, the host processor waits for the BUSY state to be finished. When the BUSY state is finished, at S218, the host processor 10 determines whether to output a command continuously. If there is a command to be output, the above process is repeated, and if there is no command to be output, the process is finished.

FIG. 5C shows the case of having the READ COMMAND. In this case, at S220, the host processor 10 writes the command, and, at S222 and S224, reads the status of the interface device 20 and checks whether the interface device 20 is on the BUSY state. If the interface device 20 is on the BUSY state, at S222 and S224, the host processor stands by. When the BUSY state is finished, at S226 the host processor 10 reads the data. If there is a command to be output, the above process is repeated, and if there is no command to be output, the process is finished.

According to the above process, the host processor 10 transmits the command to the interface device 20.

As described above, according to an aspect of the present invention, the host processor 10 controls the NAND flash memory 30 in the same interface method as a method of a general memory. Also, although a data width of the host processor 10 becomes larger, there is no need to increase the number of NAND flash memories. Also, the error detecting function is supported in a hardware level, thereby preventing the processing speed from decreasing.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An interface device interfacing between a host processor and a NAND flash memory, the interface device comprising:
    a register file receiving a command from the host processor to control an operation of the NAND flash memory and an operation information to execute the command and storing the command and the operation information;

an internal memory receiving and storing host data from the host processor and storing flash data extracted from the NAND flash memory and transmitted to the host processor;

a flash interface portion controlling a control signal to operate the NAND flash memory, outputting the command, the operation information, or the host data, and controlling an I/O signal wire through which the Dash data is inputted to the NAND flash memory; and a finite state machine extracting the command and the operation information from the register file and controlling the internal memory and the flash Interface portion to execute the command.

2. The interface device of claim 1, wherein the command is a READ command, a WRITE command, an ERASE command, an INVALID CHECK command, or a WRITE INVALID command.

3. The interface device of claim 1, wherein the operation information comprises a starting address to be assigned to a location of the NAND flash memory in which an operation according to the command is performed.

4. The interface device of claim 1, wherein the control signal comprises at least one of an ALE (Address Latch Enable) control signal, a CLE (Command Latch Enable) control signal, a CE (Chip Enable) control signal, a RE (Read Enable) control signal, and a WE (Write Enable) control signal.

5. The interface device of claim 4, wherein the interface device:

sets a signal level of the CLE control signal at a predetermined state and transmits a READ command to the NAND flash memory through the I/O signal wire to set a signal level of the ALE control signal at the predetermined state and to transmit an address where data is to be extracted to the NAND flash memory through the I/O signal wire, and transmits the data to the host processor.

6. The interface device of claim 4, wherein the interface device:

sets a signal level of the CLE control signal at a predetermined state and outputs a WRITE command through the I/O signal wire, sets a signal level of the ALE control signal at the predetermined state, and outputs twice an address through the I/O signal wire to store data in a location in the NAND flash memory.

7. The interface device of claim 6, wherein the command is inputted to the interface device using a first time command to instruct the interface device to input the data to the NAND flash memory, and a second time command to instruct to transfer the data from the NAND flash memory to a memory cell.

8. The interface device of claim 4, wherein the internal memory comprises a booting SRAM, a buffer, and an ECC checker.

9. The interface device of claim 4, wherein the flash interface portion controls the ALE, CLE, CE, OE, WE control signals and the I/O signal wire to accord with an interface standard of the NAND flash memory.

10. The interface device of claim 9, wherein when the interface standard of the NAND flash memory changes, the flash interface portion is adjusted alone to accord with the changed standard.

11. The interface device of claim 1, wherein the internal memory comprises:

a buffer storing the host data and the flash data, and a booting memory storing a booting code to boot a system.

12. The interface device of claim 11, wherein the internal memory further comprises:

an ECC checker generating an error correction code and detecting an error when the host data and the flash memory are input/output.

13. The interface device of claim 12, wherein the buffer is sectioned into pages, each of the pages having a predetermined size and having a reserved region, which is allocated with a byte for an ECC and a byte for an invalid/valid block marking.

14. The interface device of claim 1, wherein the register file comprises an address register to store a starting address.

15. The interface device of claim 1, wherein the register file comprises a command register to store the command.

16. The interface device of claim 1, wherein the register file comprises a status register to store at least one of information of an operation status of the command and a result of the execution of the command.

17. A method of interfacing between a host processor and a NAND flash memory having a control wire and an I/O signal wire, the method comprising:

receiving a command from the host processor to control an operation of the NAND flash memory and operation information to execute the command;

decoding the command and the operation information; and controlling the control wire and the I/O signal wire to execute an operation according to the decoded command.

18. The method of claim 17, wherein the controlling of the control wire comprises:

detecting an error by generating an error correction code when data is input/output in/from the NAND flash memory.

19. The method of claim 17, wherein the command is a READ command, a WRITE command, an ERASE command, an INVALID CHECK command, or a WRITE INVALID command.

20. The method of claim 17, wherein the operation information comprises a starting address assigned to a location of the NAND flash memory in which an operation according to the command is performed.

21. The method of claim 17, wherein the control signal comprises at least one of an ALE (Address Latch Enable) control signal, a CLE (Command Latch Enable) control signal, a CE (Chip Enable) control signal, a RE (Read Enable) control signal, or a WE (Write Enable) control signal.

22. The method of claim 17, wherein when the command is a READ command, the method further comprises:

outputting a value '00h' through the I/O signal wire to execute a READ operation in the NAND flash memory, where the READ command instructs to extract data from the NAND flash memory;

outputting a starting address through the I/O signal wire assigned to a location in the NAND flash memory from which the data is extracted; and sequentially reading the data from the location in the NAND flash memory.

23. The method of claim 22, further comprising:

reading a state of an interface device between the host processor and the NAND flash memory, checking whether the interface device on a BUSY state by referring to an R/B control signal that is output from the NAND flash memory, and determining whether to output a command continuously.

24. The method of claim 17, wherein when the command is a WRITE command, the method further comprises:

outputting twice a value '80h' through the I/O signal wire to execute a WRITE operation in the NAND flash memory, where the WRITE command Instructs to store data in a location in the NAND flash memory;

outputting a starting address through the I/O signal wire assigned to a location in the NAND flash memory from which the data is stored;

outputting a value '10h'; and reading a value of a status register from the location in the NAND flash memory.

25. The method of claim 24, further comprising:

reading a state of an interface device between the host processor and the NAND flash memory, checking whether the interface device on a BUSY state by referring to an R/B control signal that is output from the NAND flash memory, and determining whether to output a command continuously.

26. The method of claim 17, wherein when the command is an ERASE command, the method further comprises:

outputting twice a value '60h' through the I/O signal wire to execute an ERASE operation in the NAND flash memory, where the ERASE command Instructs to delete data from a location in the NAND flash memory;

outputting a starting address through the I/O signal wire assigned to a location in the NAND flash memory from which the data is deleted;

outputting a value 'D0h' through the I/O signal; and reading a value of a status register from the location of the NAND flash memory.

27. The method of claim 26, further comprising:

reading a state of an interface device between the host processor and the NAND flash memory, checking whether the interface device on a BUSY state by referring to an R/B control signal that is output from the NAND flash memory, and determining whether to output a command continuously.

28. The method of claim 27, further comprising:

interrupting the host processor in a hardware level after checking a signal of a pin ASCI_BUSY to determine whether the BUSY state has ended.

29. The method of claim 17, wherein when the command is an INVALID CHECK command, the method further comprises:

outputting a value '50h' through the I/O signal wire to execute an INVALID CHECK operation, where the INVALID CHECK command instructs to search an invalid block that has at least one defective bit in a location in the NAND flash memory;

outputting an address of a block to be checked in the NAND flash memory;

reading data and checking whether a 6th byte of a spare area in the NAND flash memory is 'FFh', wherein information of an invalid block is stored in the 6th byte of the spare area.

30. The method of claim 17, wherein there is no defective bit when the spare area is 'FFh'.

31. The method of claim 17, wherein when the command is a WRITE INVALID command, the method further comprises:

outputting a value '50h' and a value '80h' through the I/O signal wire to execute a WRITE INVALID operation in the NAND flash memory, where the WRITE INVALID command uses invalid block Information in a location in the NAND flash memory;

writing a value corresponding to the invalid block information of a 6th byte data of a spare area in the NAND flash memory;

outputting a value '10h' through the I/O signal; and reading a value of a status register from the location of the NAND flash memory.

* * * * *

UNITED STATES PATENT AND TRADEMARK OFFICE
CERTIFICATE OF CORRECTION

PATENT NO. : 6,985,778 B2 Page 1 of 1
APPLICATION NO. : 10/446146
DATED : January 10, 2006
INVENTOR(S) : Jin-soo Kim et al.

It is certified that error appears in the above-identified patent and that said Letters Patent is hereby corrected as shown below:

<u>Column 11,</u>
Line 9, replace "Dash" with -- flash --.
Line 12, replace "Interface" with -- interface --.

<u>Column 13,</u>
Lines 6 and 25, replace "Instructs" with -- instructs --.

<u>Column 14,</u>
Line 29, replace "Information" with -- information --.

Signed and Sealed this

Twentieth Day of June, 2006

JON W. DUDAS
*Director of the United States Patent and Trademark Office*